(12) United States Patent
Haueter et al.

(10) Patent No.: US 10,073,689 B2
(45) Date of Patent: Sep. 11, 2018

(54) MANAGING APPLICATION LIFECYCLES WITHIN A FEDERATION OF DISTRIBUTED SOFTWARE APPLICATIONS

(71) Applicant: AppDynamics LLC, San Francisco, CA (US)

(72) Inventors: Christopher Matthew Haueter, San Francisco, CA (US); Vamshi Krishna Bhoopalam, Fremont, CA (US); Madhu Pranil Dasika, Fremont, CA (US); Karan Kaushik, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/814,789

(22) Filed: Jul. 31, 2015

(65) Prior Publication Data

US 2017/0031667 A1   Feb. 2, 2017

(51) Int. Cl.
*G06F 9/44* (2018.01)
*G06F 9/445* (2018.01)
*G06F 8/60* (2018.01)
*G06F 8/71* (2018.01)
*G06F 8/65* (2018.01)

(52) U.S. Cl.
CPC ............... *G06F 8/60* (2013.01); *G06F 8/71* (2013.01); *G06F 8/65* (2013.01)

(58) Field of Classification Search
CPC ............... G06F 8/60; G06F 8/61–8/71; G06F 9/44505; H04L 67/10
See application file for complete search history.

(56) References Cited

U.S. PATENT DOCUMENTS

| | | | | |
|---|---|---|---|---|
| 6,789,215 B1* | 9/2004 | Rupp | ........................ | G06F 8/61 |
| | | | | 714/38.14 |
| 7,310,801 B2* | 12/2007 | Burkhardt | ................ | G06F 8/65 |
| | | | | 717/169 |
| 7,698,375 B2* | 4/2010 | Hinton | .................... | G06F 21/41 |
| | | | | 709/203 |

(Continued)

OTHER PUBLICATIONS

Fabio Mancinelli, Managing the Complexity of Large Free and Open Source Package-Based Software Distributions, pp. 1-10, 2006. https://ieeexplore.ieee.org/stamp/stamp.jsp?tp=&arnumber=4019575 (Year: 2006).*

(Continued)

*Primary Examiner* — Mongbao Nguyen
(74) *Attorney, Agent, or Firm* — Parker Ibrahim & Berg LLP; James M. Behmke; Stephen D. LeBarron

(57) ABSTRACT

An application lifecycle manager manages the lifecycles of different applications. The application lifecycle manager allows for development teams to control how their applications are updated by providing script which performs the lifecycle task. The tool includes an interface that receives a package which includes the script, configuration information, any dependency data needed to implement the lifecycle task. Hence, the development teams have control over how their applications are updated modified because the package is passed through the interface directly to the application. The tool includes the interface receive the package, and includes logic to open the package and apply the package contents to the application as part of the lifecycle.

12 Claims, 8 Drawing Sheets

(56) References Cited

U.S. PATENT DOCUMENTS

| | | | | |
|---|---|---|---|---|
| 8,434,080 | B2* | 4/2013 | Yendluri | G06F 8/60 717/177 |
| 8,868,608 | B2* | 10/2014 | Friedman | G06F 11/3664 707/787 |
| 8,869,140 | B2* | 10/2014 | Todorova | G06F 8/61 717/126 |
| 8,972,963 | B2* | 3/2015 | Baset | G06F 8/68 717/168 |
| 8,997,078 | B2* | 3/2015 | Spivak | G06F 9/5055 717/168 |
| 9,268,592 | B2* | 2/2016 | Hassine | G06F 9/45558 |
| 9,383,984 | B2* | 7/2016 | Mantripragada | G06F 8/60 |
| 9,395,967 | B2* | 7/2016 | Dingsor | G06F 8/60 |
| 9,483,248 | B2* | 11/2016 | Ramasamy | |
| 9,843,487 | B2* | 12/2017 | Mordani | H04L 41/5041 |
| 9,923,952 | B2* | 3/2018 | Maes | H04L 67/10 |
| 9,928,059 | B1* | 3/2018 | Sartor | G06F 8/71 |
| 2004/0107417 | A1* | 6/2004 | Chia | G06F 8/65 717/171 |
| 2004/0139430 | A1* | 7/2004 | Eatough | G06F 8/68 717/174 |
| 2006/0020679 | A1* | 1/2006 | Hinton | G06F 21/41 709/217 |
| 2006/0265708 | A1* | 11/2006 | Blanding | G06F 8/61 717/174 |
| 2007/0220510 | A1* | 9/2007 | Bell | G06F 9/4446 717/174 |
| 2009/0043778 | A1* | 2/2009 | Jambunathan | G06F 17/30563 |
| 2009/0300151 | A1* | 12/2009 | Friedman | G06F 11/3664 709/222 |
| 2011/0107299 | A1* | 5/2011 | Dehaan | G06F 9/45533 717/121 |
| 2011/0161913 | A1* | 6/2011 | Garimella | G06F 8/10 717/101 |
| 2011/0265164 | A1* | 10/2011 | Lucovsky | G06F 9/45533 726/7 |
| 2011/0271278 | A1* | 11/2011 | Dittrich | G06F 8/60 718/1 |
| 2011/0296377 | A1* | 12/2011 | Morozov | G06F 8/30 717/113 |
| 2012/0102486 | A1* | 4/2012 | Yendluri | G06F 8/60 717/177 |
| 2012/0266156 | A1* | 10/2012 | Spivak | G06F 9/5055 717/172 |
| 2012/0324069 | A1* | 12/2012 | Nori | H04L 41/0806 709/222 |
| 2013/0205293 | A1* | 8/2013 | Levijarvi | G06F 8/61 717/177 |
| 2013/0232463 | A1* | 9/2013 | Nagaraja | G06F 8/61 717/101 |
| 2013/0263104 | A1* | 10/2013 | Baset | G06F 8/68 717/168 |
| 2014/0196022 | A1* | 7/2014 | Skutin | G06F 8/61 717/176 |
| 2014/0208303 | A1* | 7/2014 | Asayag | G06F 8/68 717/170 |
| 2014/0282495 | A1* | 9/2014 | Chico de Guzman Huerta | G06F 8/61 717/177 |
| 2015/0199197 | A1* | 7/2015 | Maes | G06F 8/71 717/122 |
| 2015/0242197 | A1* | 8/2015 | Alfonso | G06F 8/65 717/173 |
| 2015/0347119 | A1* | 12/2015 | Wang | G06F 8/65 717/120 |
| 2015/0378702 | A1* | 12/2015 | Govindaraju | G06F 8/60 717/177 |
| 2015/0378716 | A1* | 12/2015 | Singh | G06F 8/65 717/172 |
| 2016/0019043 | A1* | 1/2016 | Ramasamy | G06F 8/67 717/171 |
| 2016/0103678 | A1* | 4/2016 | Akbulut | G06F 8/70 717/120 |

OTHER PUBLICATIONS

DigitalOcean, How to Use Roles and Environments in Chef to Control Server Configurations, pp. 1-14, 2014. https://www.digitalocean.com/community/tutorials/how-to-use-roles-and-environments-in-chef-to-control-server-configurations (Year : 2014).*

Oracle, Oracle Database lifecycle management pack, pp. 1-5, 2013 http://www.oracle.com/technetwork/oem/pdf/511949.pdf (Year: 2013).*

Microsoft, Deploying Web Applications in Enterprise Scenarios using Visual Studio 2010, pp. 50, 55, 61, 69, 76 and 79, 2012 https://docsmicrosoft.com/en-us/aspnet/web-forms/overview/deployment/deploying-web-applications-in-enterprise-scenarios/deploying-web-applications-in-enterprise-scenarios (Year: 2012).*

* cited by examiner

MANAGING APPLICATION LIFECYCLES WITHIN A FEDERATION OF DISTRIBUTED SOFTWARE APPLICATIONS

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. Most application monitoring tools provide a standard report regarding application performance. When an application health is determined to have degraded, actions are often taken to correct the application such as apply updates or restart, or sometimes stop the application.

Customers who have applications monitored will need to perform lifecycle tasks on their applications. The applications routinely need to be restarted, configured, modified, and otherwise process as part of their normal lifecycle. With modern distributed web services having dozens, hundreds or even thousands of applications and nodes, it can be extremely time-consuming to manually perform lifecycle management on these applications. Further, when these applications have different protocols or platforms, it makes the lifecycle management process that much more complicated. What is needed is a system for managing application lifecycle deployment.

SUMMARY

The present technology, roughly described, provides an application lifecycle manager for managing the lifecycles of different applications. The application lifecycle manager allows for development teams to control how their applications are updated by providing script which performs the lifecycle task. The tool includes an interface that receives a package which includes the script, configuration information, any dependency data, and anything else needed to implement the lifecycle task. Hence, the development teams have control over how their applications are updated modified because the package is passed through the interface directly to the application. The tool includes the interface receive the package, and includes logic to open the package and apply the package contents to the application as part of the lifecycle.

Several lifecycle events are structured and easily implemented through packet is received by the interface. The tool also allows for arbitrary commands to be applied to the application. A package with an arbitrary command as well as configuration information may be received by the interface. The tool may apply the command and configuration data to a template for generating a property file. Resulting property file will include the command as well as configuration data, and provide the property file to the application. The application may process the property file it is restarted.

An embodiment may include a method for deploying an application. The method may begin with providing an interface for receiving a package associated with an application on a server, wherein the interface is compatible with a plurality of application types. A package is received for the application through the interface at the server. The script retrieved from the package is invoked to perform a lifecycle task for the application at the server. Data is received for an arbitrary command at the server for the application through the interface. The arbitrary command data is provided to the application at the server.

An embodiment may include a system for monitoring a network session. The system may include a processor, memory, and one or more modules stored in memory and executable by the processor. When executed, the modules may provide an interface for receiving a package associated with an application on a server, the interface compatible with a plurality of application types, receive a package for the application through the interface at the server, invoke the script retrieved from the package to perform a lifecycle task for the application at the server, receive data for an arbitrary command at the server for the application through the interface, and provide the arbitrary command data to the application at the server.

DETAILED DESCRIPTION

The present technology, roughly described, provides an application lifecycle manager for managing the lifecycles of different applications. The application lifecycle manager (ALM) allows development teams to control how their applications are updated by providing scripts which perform lifecycle tasks. The manager includes an interface that receives a package from development teams that is directly passed onto the application. The package may include the script, configuration information, dependency data and files, and anything else needed to implement the lifecycle task. The script may be applied to the application to perform a lifecycle task on the application.

Several lifecycle events are structured and easily implemented through the packet which is received via the interface. In addition to structured commands, the manager also allows for arbitrary commands to be applied to the application. A package with an arbitrary command and configuration information may be received by the interface. The manager may apply the command and configuration data to a template for generating a property file, wherein the resulting property file will include the command as well as configuration data. The property file may then be provided to the application. The application may process the property file once it is restarted.

Figure 1:
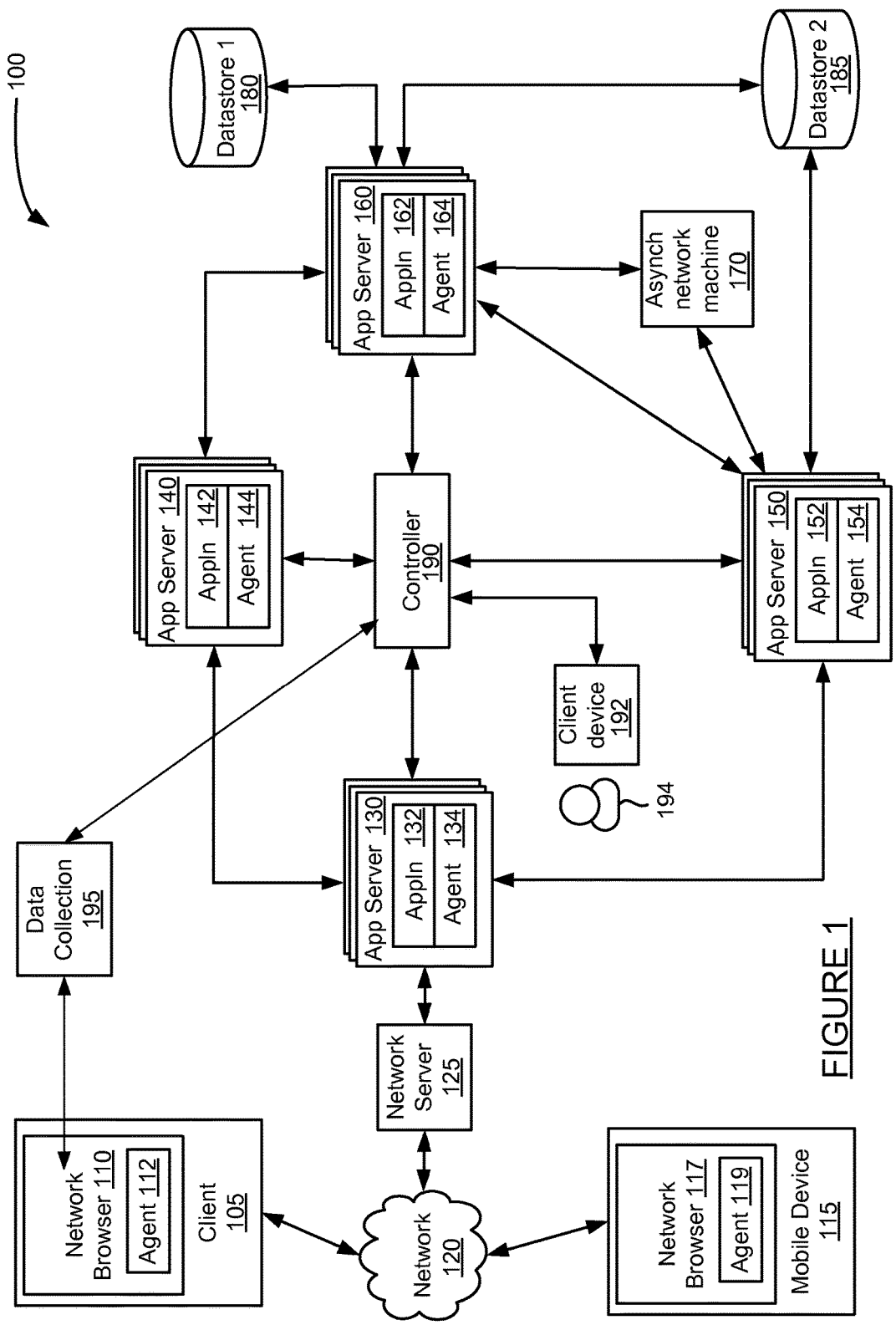
FIG. 1 is a block diagram of a system for implementing an application lifecycle manager.

FIG. 1 is a block diagram of a system for implementing in ALM. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, user interactions with content pages and user activity at the client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as for example a Java, PHP, .NET, Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, server 130 may include Java code, .NET code, PHP code, Ruby code, C code or other code to implement applications and process requests received from a remote source.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .NET, or C program), machine resources, network layer data, and communicate with byte instrumented code on application server 130 and one or more applications on application server 130.

Each of agents 134, 144, 154 and 164 may include one or more agents, such as a language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878, 919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data, machine monitoring data, and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as content page, e.g. a web page, which may be provided to and rendered through a network browser application on client device 192.

Figure 2:
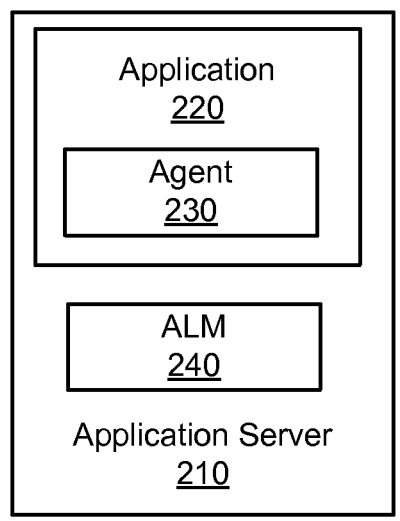
FIG. 2 is a block diagram of an application server.

FIG. 2 is a block diagram of an application server. Application server 210 includes application 220 and ALM 240. Agent 230 may reside on application 220 and monitor the application. ALM 240 may be implemented on the application server and may manage the lifecycle of application 220. The ALM 240 may receive script code and other data to apply to application 220, update and determine a health check for the application, as well as perform logic as part of the lifecycle management. ALM 240 is described in more detail below respect to the FIG. 3.

Figure 3:
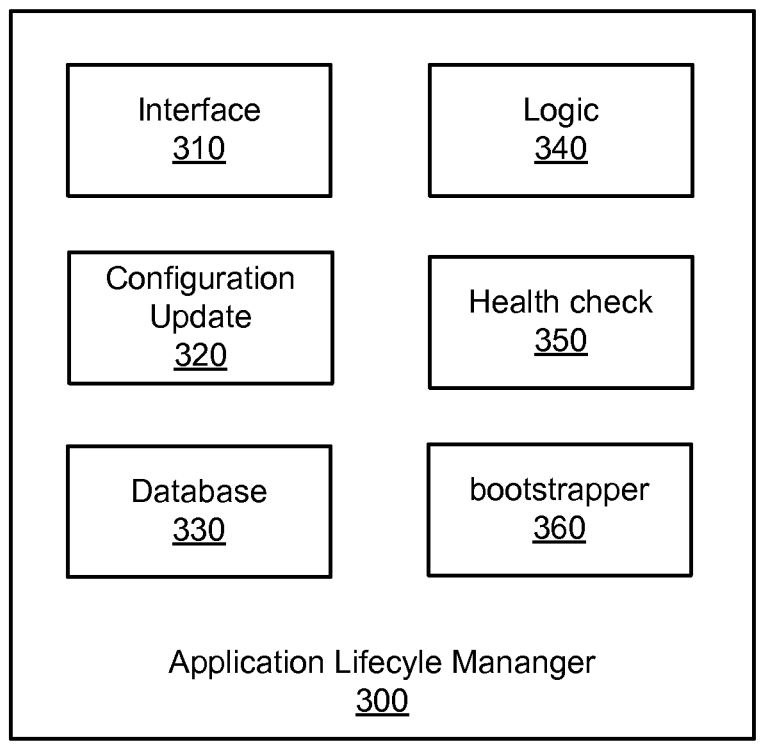
FIG. 3 is a block diagram of an application lifecycle manager.

FIG. 3 is a block diagram of an ALM. ALM 300 may reside on a host machine that includes an application and may include interface 310, configuration update 320, database 330, logic 340, health check 350, and bootstrap 360. Interface 310 may receive a package from a remote server, such as for example from a developer or team that is managing a particular application. The interface may be a code level interface which allows teams to make changes to their application artifacts, such as, for example, binaries, scripts, configuration templates, validations, health checks, and deployment roles, within their own code bases. The ALM aggregates these artifacts and packages them for the customer to install, deploy and lifecycle manage.

Configuration update module 320 may render templates with configuration values and execute commands, such as a restart command. The configuration update may access templates from database 330, which may store data for the ALM.

Logic 340 may analyze a state of an application, determine if any lifecycle tasks should be performed, and executes a script from a received package to implement lifecycle tasks. For example, logic 340 may implement commands such as execute a provisioning script on an application after the application has been installed. Health check 350 may perform a health check on an application. In some instances, the health check may include accessing a URL to determine a binary state of the application as positive or negative. Bootstrap 360 may be used to install the ALM, update the manager, and uninstall the manager.

Figure 4:
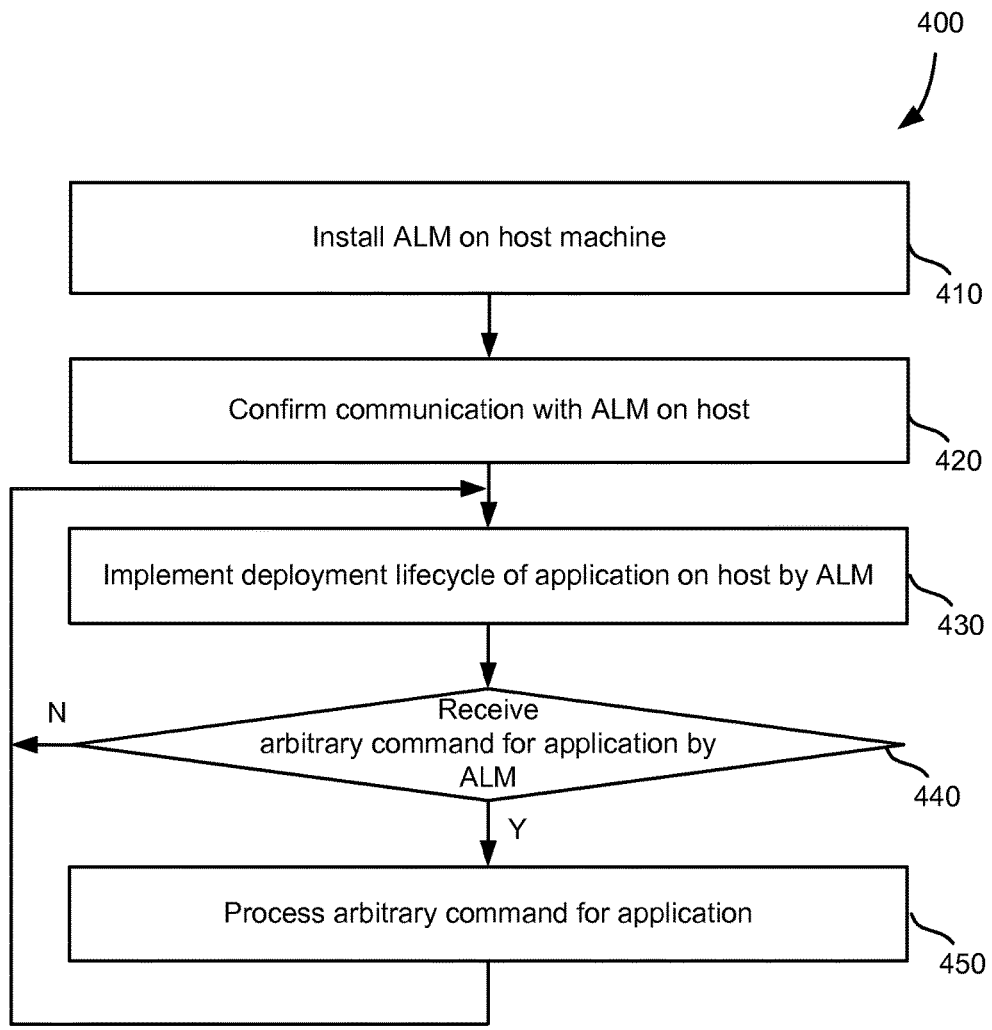
FIG. 4 is a method for managing an application lifecycle.

FIG. 4 is a block diagram of a method for managing a lifecycle for an application. First, the ALM may be installed on the host machine at step 410. The ALM may be installed by the bootstrap module on the host machine. Communication may be confirmed with the ALM at the host at step 420. The communication confirmation may come from a remote server, such as a controller, a machine associated with a team that is managing the application, or some other location.

Once communication has been confirmed with the ALM, a deployment lifecycle is implemented for the application on the host by the ALM at step 430. Implementing the lifecycle may begin with cycling through several preset lifecycle stages, such as provisioning an application, configuring a service, and starting the service. Subsequent deployment lifecycles may depend on application performance and information received from a team that manages the application. Implementing deployment lifecycles for an application is discussed in more detail below with respect to the method of FIG. 5.

A determination is made at step 440 as to whether an arbitrary command is received for the application by the ALM. If no arbitrary command is received, the method of FIG. 4 returns to step 430. If an arbitrary command is received, the arbitrary command may be processed for the application at step 450. Processing an arbitrary command may include identifying parts of the command, generating a file from a template based on the command data, and other actions. Processing an arbitrary command for an application is discussed in more detail below with respect to the method of FIG. 7.

Figure 5:
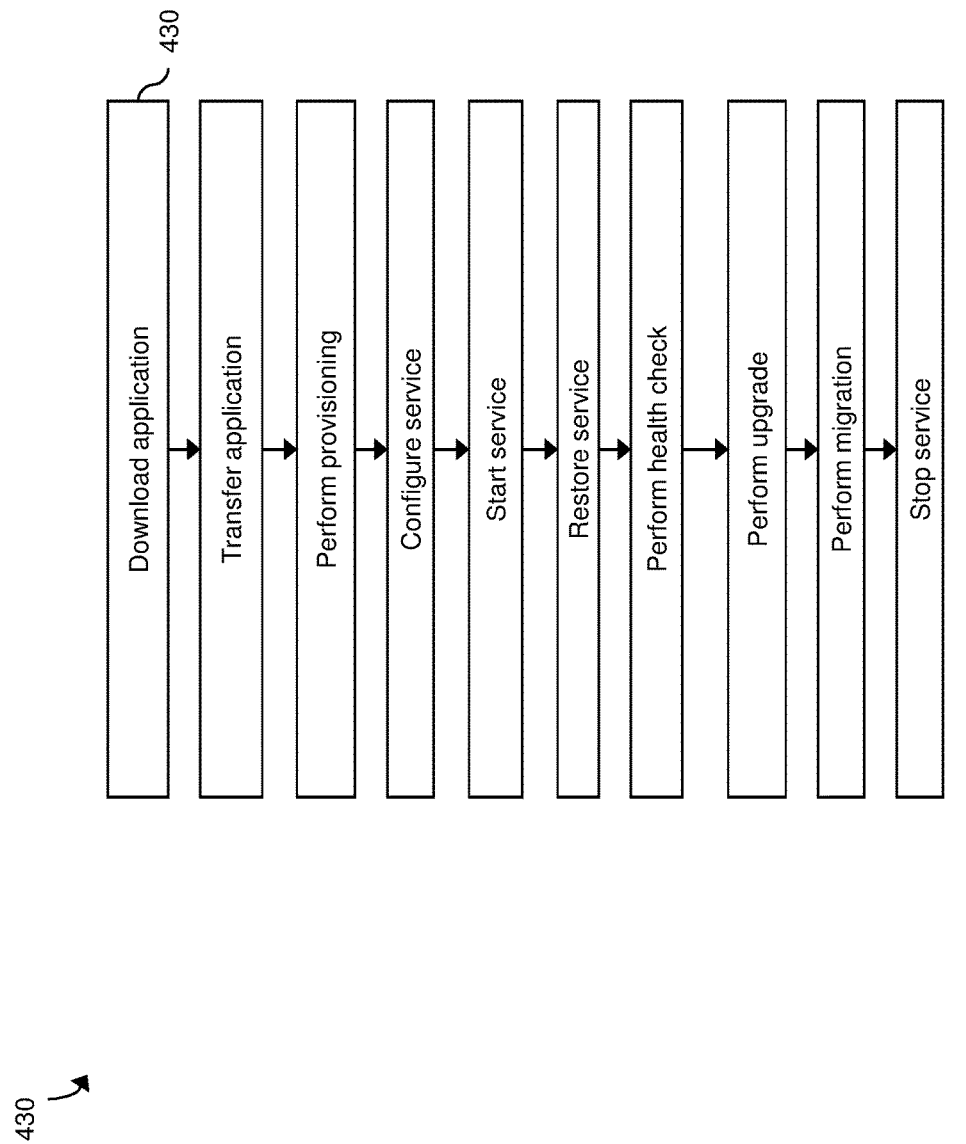
FIG. 5 is a method for implementing a deployment lifecycle.

FIG. 5 illustrates a method implementing a deployment lifecycle of an application. Method of FIG. 5 provides more detail for step 430 of the method of FIG. 4. First, the application is downloaded at step 510. Once downloaded, application data may be unpacked and transferred to the host application machine at step 520. After the application is transferred to the host machine, provisioning may be performed on the application at step 530. More detail for provisioning the application is discussed with respect to the method of FIG. 6. The application servers may be configured at step 540. Figuring the service may include setting up ports, and providing other information to pair the service for its execution. Once the service is configured, the service may be started at step 550.

Each of the lifecycle events of steps 510-550 may be performed based on a package received by an interface of the ALM. The package may include a script and context information in which to run that script. A particular script may correspond to each step of the method of FIG. 5.

The application service may be restarted at some point at step 560. A health check may be performed at steps 570. The health check may involve checking the status of a webpage determine if the health is positive or negative, or to retrieve other information from about the health from the URL associated with the health check. An upgrade may be performed at step 580. The upgrade may be implemented using script contained in the package along with any dependencies required by the script. A migration may be performed at step 590. At some point, the services may be stopped at step 595.

Figure 6:
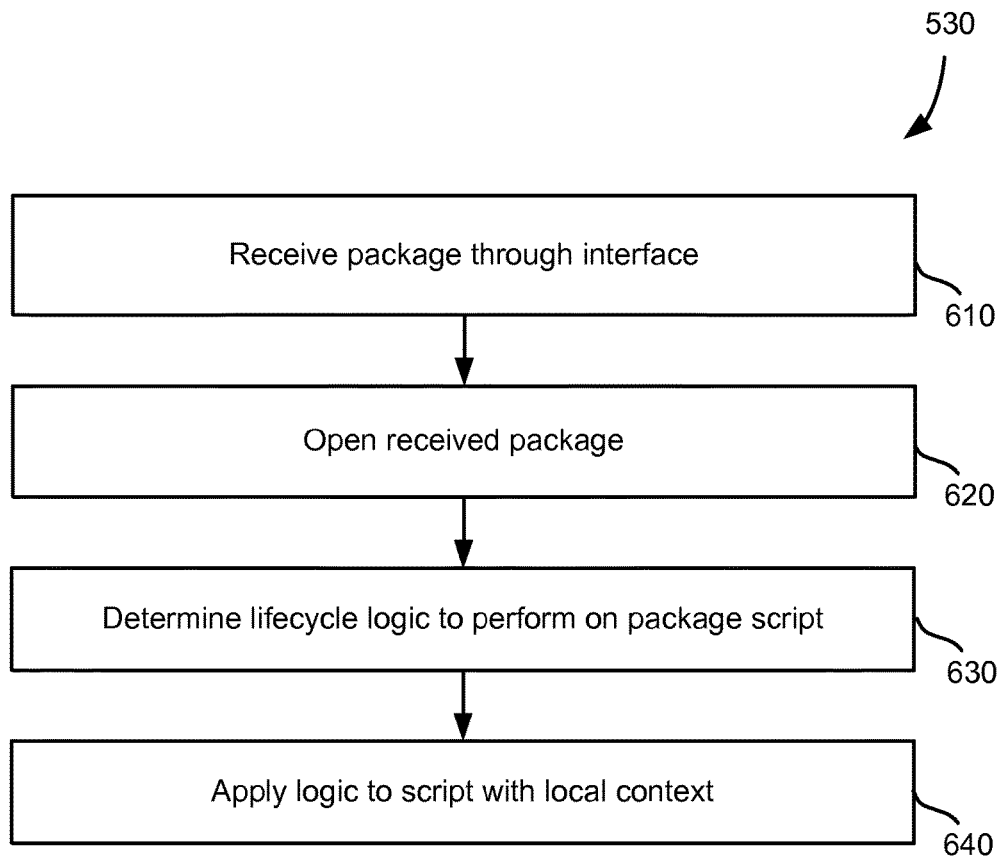
FIG. 6 is a method for performing provisioning.

FIG. 6 is a method for performing provisioning on an application. The method of FIG. 6 provides more detail for step 530 of the method of FIG. 5. First, a package is received through the interface at step 610. The package may be opened at step 620. The package may include data and other content associated with provisioning an application. For example, the package may include a provisioning script, contacts information, and other data that can be passed on to the application.

A determination is made as to the lifecycle logic to perform on the package script at step 630. Logic within the ALM may identify the type of script received the package and determine, from the script and configuration data included in the package, what lifecycle event or task should be performed. For example, if the script contained in the package is named provisioning script, or some other title associated with a provisioning task, the logic may determine that the script should be applied to the application as part of a provisioning lifecycle task. The determined logic from step 630 is an applied to the script with the local context at step 640. Local context may indicate information needed to carry out the script that is not available from the source, such as available port, IP address, and other data.

Figure 7:
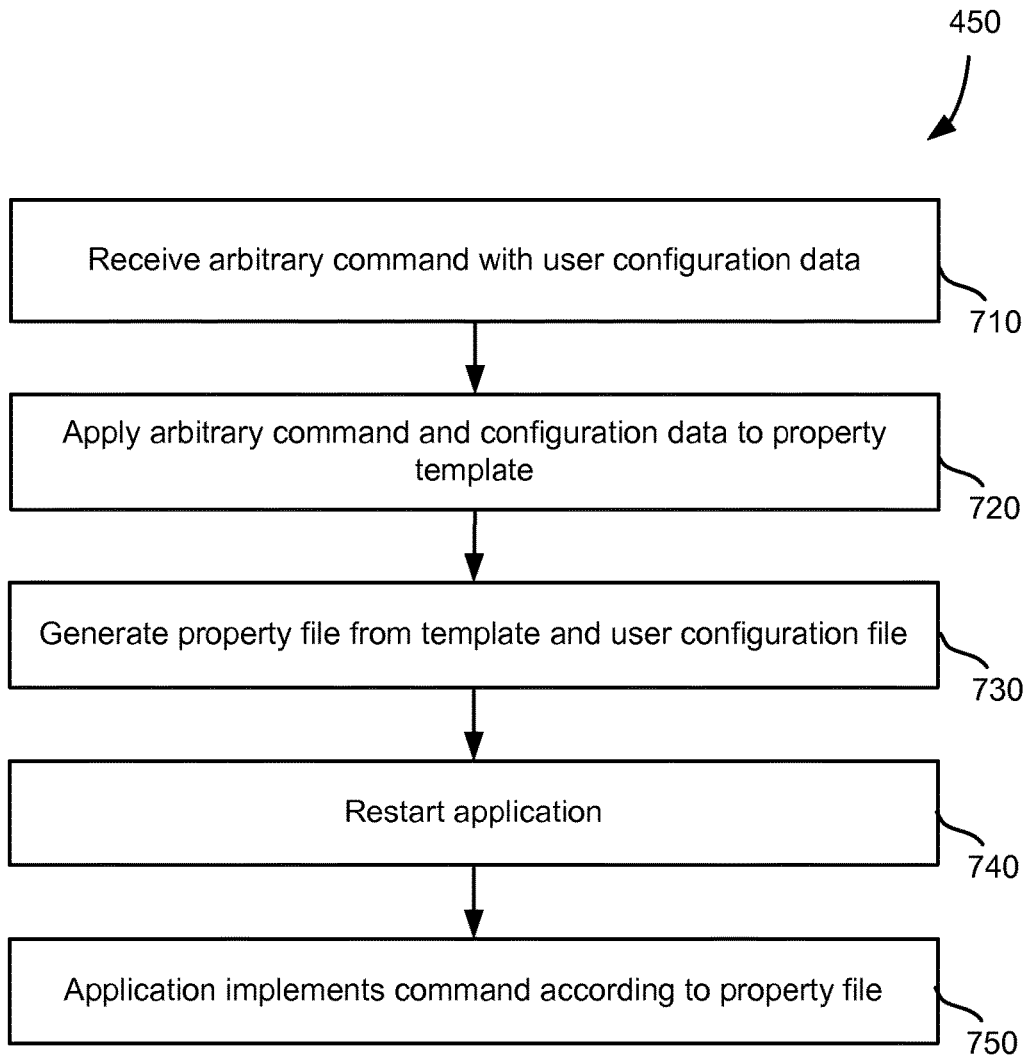
FIG. 7 is a method for processing arbitrary commands for an application.

FIG. 7 is a block diagram of a method for processing an arbitrary command for an application. Method of FIG. 7 provides more detail for step 450 of the method of FIG. 4. First, the arbitrary command may be received with user configuration data at step 710. The arbitrary command may be any command, placed in the form of a script, which is not in the scheduled lifecycle tasks discussed with respect to the method of FIG. 5. User configuration data may indicate settings and other data for carrying out the arbitrary command.

The arbitrary command and configuration data may be applied to a property template at step 720. The property templates may be used to generate a property file from a received arbitrary command and corresponding configuration data. The arbitrary command and configuration data is used to instantiate a template into a property file, which is provided to an application to carry out the arbitrary command.

The property file may be generated from the template and user configuration file at step 730. The property file may be generated by logic within the ALM and stored in a database contained within or accessible to the ALM. The application is restarted at step 740 and the application implements the arbitrary command according to the property file at step 750.

Figure 8:
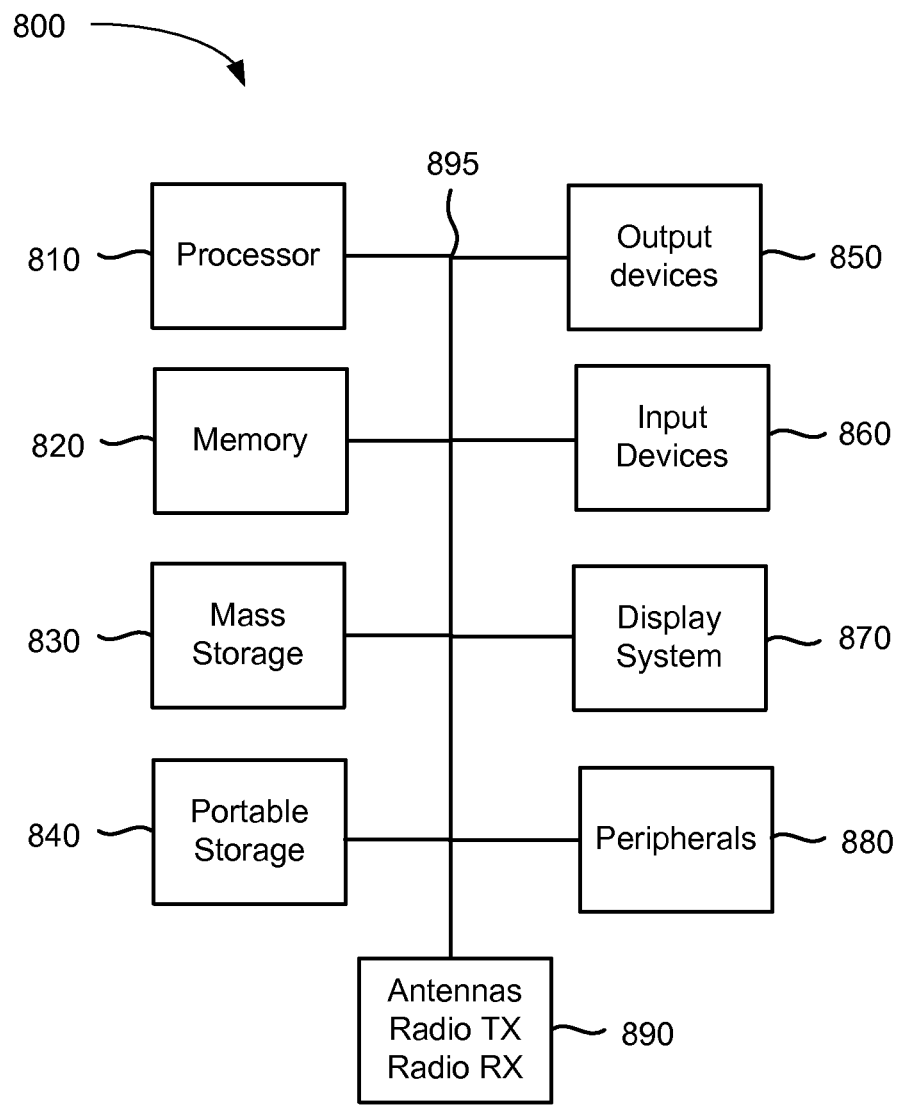
FIG. 8 is a block diagram of a computing environment for implementing the present technology.

FIG. 8 is a block diagram of a system for implementing the present technology. System 800 of FIG. 8 may be implemented in the contexts of the likes of client computer 105 and 192, servers 125, 130, 140, 150, and 160, machine 170, data stores 180 and 190, and controller 190. The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive, an optical disk drive, a flash drive, or other device, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a floppy disk, compact disk or Digital video disc, USB drive, memory card or stick, or other portable or removable memory, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device. Display system 870 may also receive input as a touch-screen.

Peripherals 880 may include any type of computer support device to add additional functionality to the computer system. For example, peripheral device(s) 880 may include a modem or a router, printer, and other device.

The system of 800 may also include, in some implementations, antennas, radio transmitters and radio receivers 890. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for controlling how to manage lifecycle tasks of an application on a server, the method being executable by a processor comprising:
   providing an application lifecycle manager for updating the application executing on the server and managing the lifecycles of different applications;
   managing, by the application lifecycle manager, lifecycle tasks of the application on the server;
   receiving, through an interface of the application lifecycle manager, a package for updating the application on the server, wherein the interface is compatible with a plurality of application types and the package includes a script representing one or more of the lifecycle tasks and context information for carrying out the script;
      wherein the package includes configuration schema and dependency data; and
      identifying a type of the lifecycle task to perform, wherein the type of lifecycle task includes a provisioning lifecycle task, a start service lifecycle task, a restart service lifecycle task, a data backup lifecycle task, or a data restore lifecycle task;
   invoking, by the application lifecycle manager, the script in the package to perform the one or more of the lifecycle tasks for the executing application on the server;
   receiving, through the interface, an arbitrary command and corresponding configuration data for carrying out the arbitrary command;
   applying, by the application lifecycle manager, the arbitrary command and the corresponding configuration data to a property template to generate a property file;
   instantiating, by the application lifecycle manager, the property template with configuration values into the property file to execute commands that include a restart command for the application to restart; and
   providing, by the application lifecycle manager, the property file to the executing application on the server for the application to carry out the arbitrary command according to the property file.

2. The method of claim 1, wherein the context information for carrying out the script is determined from a local machine.

3. The method of claim 1, including analyzing a state of the application to determine whether the lifecycle task should be performed.

4. The method of claim 1, including performing a health check on the application.

5. A non-transitory computer readable storage medium having embodied thereon a program, the program being executable by a processor to perform operations for controlling how to manage lifecycle tasks of an application on a server updated, the operations including:
   providing an application lifecycle manager for updating the application executing on the server and managing the lifecycles of different applications;
   managing, by the application lifecycle manager, lifecycle tasks of the application on the server;
   receiving, through an interface of the application lifecycle manager, a package for updating the application on the server, wherein the interface is compatible with a plurality of application types and the package includes a script representing one or more of the lifecycle tasks and context information for carrying out the script;
      wherein the package includes configuration schema and dependency data; and
      identifying a type of the lifecycle task to perform, wherein the type of lifecycle task include a provisioning lifecycle task, a start service lifecycle task, a restart service lifecycle task, a data backup lifecyle task, or a data restore lifecycle task;
   invoking, by the application lifecycle manager, the script in the package to perform the one or more of the lifecycle tasks for the executing application on the server;
   receiving, through the interface, an arbitrary command and corresponding configuration data for carrying out the arbitrary command;
   applying, by the application lifecycle manager, the arbitrary command and the corresponding configuration data to a property template to generate a property file;
   instantiating, by the application lifecycle manager, the property template with configuration values into the property file to execute commands that include a restart command for the application to restart; and
   providing, by the application lifecycle manager, the property file to the executing application on the server for the application to carry out the arbitrary command according to the property file.

6. The non-transitory computer readable storage medium of claim 5, wherein the operations include analyzing a state of the application to determine whether the lifecycle task should be performed.

7. The non-transitory computer readable storage medium of claim 5, wherein the operations including performing a health check on the application.

8. A system for controlling how to manage lifecycle tasks of an application on a server, the system comprising:

a memory and a processor on the server; and
one or more modules stored in the memory and executed by the processor to perform operations as an application lifecycle manager that is configured to update the application executing on the server, the process configured to:
provide the application lifecycle manager for updating the application executing on the server and managing the lifecycles of different applications;
manage, by the application lifecycle manager, lifecycle tasks of the application on the server;
receive, through an interface of the application lifecycle manager, a package for updating the application on the server, wherein the interface is compatible with a plurality of application types and the package includes a script representing one or more of the lifecycle tasks and context information for carrying out the script;
wherein the package includes configuration schema and dependency data; and
identify a type of the lifecycle task to perform, wherein the type of lifecycle task include a provisioning lifecycle task, a start service lifecycle task, a restart service lifecycle task, a data backup lifecycle task, or a data restore lifecycle task;
invoke the script in the package to perform the one or more of the lifecycle tasks for the executing application on the server;
receive, through the interface, an arbitrary command and corresponding configuration data for carrying out the arbitrary command;
apply, by the application lifecycle manager, the arbitrary command and the corresponding configuration data to a property template to generate a property file;
instantiate, by the application lifecycle manager, the property template with configuration values into the property file to execute commands that include a restart command for the application to restart; and
provide, by the application lifecycle manager, the property file to the executing application on the server for the application to carry out the arbitrary command according to the property file.

9. The system of claim 8, wherein the one or more modules are executable to determine the context information for carrying out the script is from a local machine.

10. The system of claim 8, wherein the one or more modules are executable to store the generated property file.

11. The system of claim 8, wherein the one or more modules are executable to analyze a state of the application to determine whether the lifecycle task should be performed.

12. The system of claim 8, wherein the one or more modules are executable to perform a health check on the application.

* * * * *